United States Patent Office 3,200,181
Patented Aug. 10, 1965

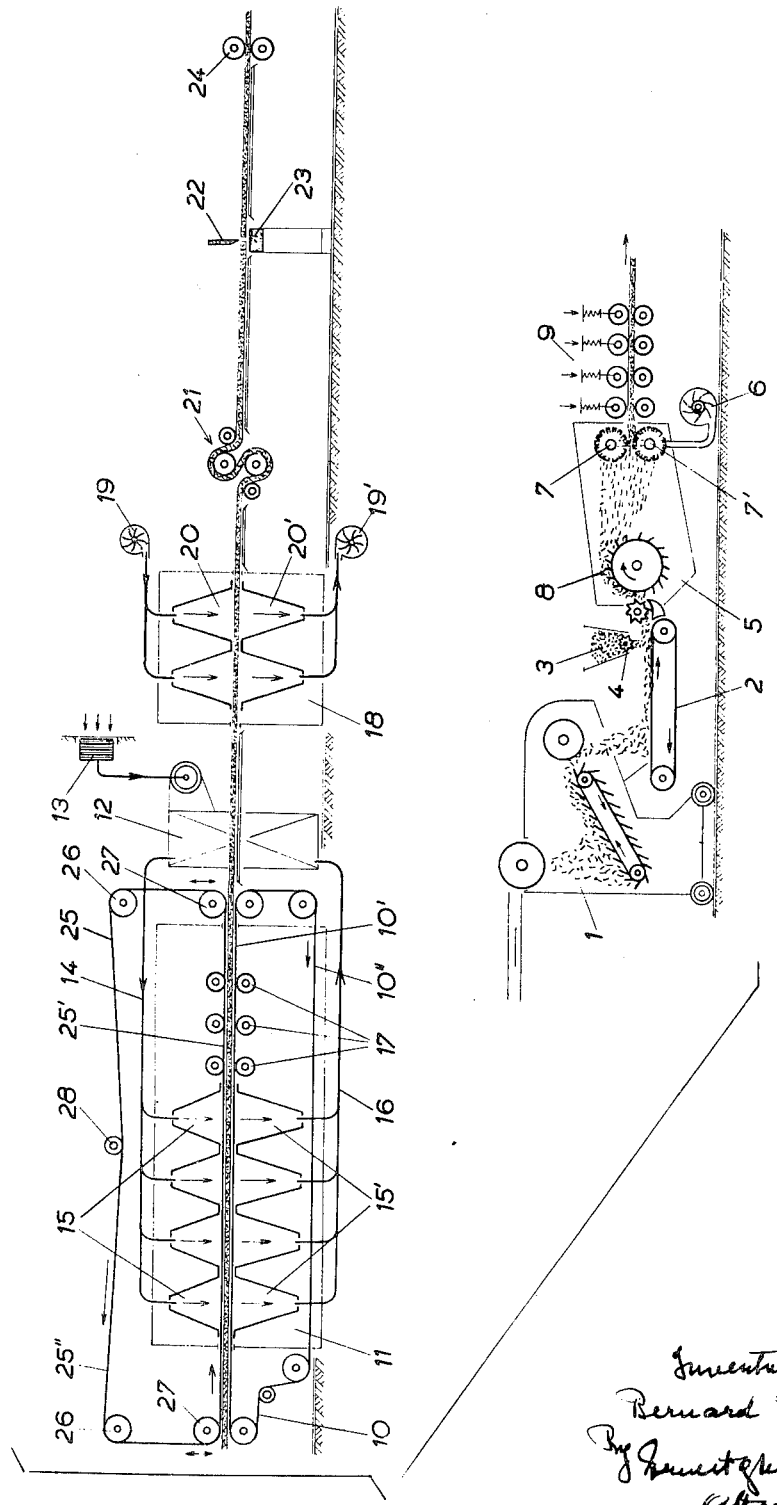

3,200,181
METHOD OF AND MEANS FOR MANUFACTURING PADDING AND INSULATING MATERIALS COMPRISING FIBRES
Bernard Rudloff, Marckolsheim, Bas-Rhin, France
Filed May 18, 1962, Ser. No. 195,872
Claims priority, application France, May 29, 1961, 7,158/61; Jan. 15, 1962, 7,320/62, Patent 1,291,938
7 Claims. (Cl. 264—109)

The present invention relates to the manufacture of padding and insulating materials, starting from textile fibres of animal, vegetable or artificial nature, in flock or frayed form, such for example as jute, kapok, cotton, rayon, nylon and similar fibres.

The importance of the use of seat and bench paddings especially in the automobile industry is known, and it is known more particularly that the foam material made from rubber, plastic materials, polyesters, polyurethane etc., permit of producing very light paddings having great flexibility. However the cost of manufacture of these foam materials is very high. Furthermore they have the disadvantage of not being air-permeable and of not absorbing perspiration which condenses thereon, this being a great drawback from the hygienic viewpoint.

It is one object of the present invention to provide a method of and means for manufacturing padding and insulating materials comprising fibres which permits obtaining a significant economy in the preparation of paddings, starting from textile fibres of any nature, due to the continuous production method which is economic in application, ensuring a significant simplificaton in manufacture, the particular features of the execution of which impart to the finished product obtained a range of qualities extending from very great flexibility and lightness permitting of thereby competing with the foam materials of rubber and plastic materials, to a great compactness and a hardness comparable with that of wood. Furthermore these products retain all their textile properties, especially those of hygroscopic exchange, heat reserve, sterility etc.

It is another object of the present invention to provide a method of and means for manufacturing padding and insulating materials, wherein the proposed manufacturing method consists, starting from textile fibres in flock or frayed form, in charging with an appropriate quantity of powdered synthetic resins a more or less thick layer of these fibres, which are rolled into a sheet, in subjecting this sheet to a current of hot air which passes through it from one side to the other in order to effect its polymerisation and goffering on both surfaces, while causing the agglomeration of the fibres by a fresh rolling, then in exposing it to a current of cold air, while humidifying it and at the same time adding fire-proofing and germicidal products, and finally in passing the sheet over a heated calender at controllable pressure according to the quality to be obtained, it then being possible for the sheet with smooth or channeled surface to be divided into rolls of the desired width or diameter.

The present invention also relates to a device for the execution of the method in continuous fashion, which method comprises, according to the sequence of the manufacturing phases, an automatic arrangement charging the fibres on to a conveyor, a dosage device supplying the powdered synthetic resin, an enclosure provided with a vacuum fibre divider and drums which suck the fibres and form a sheet, a train of regulable pressure cylinders imparting to this sheet the desired compactness, a hot atmosphere tunnel in which a current of hot air is distributed by a series of cones and passes right through the sheet disposed between the operative lengths of two endless latticed belts disposed in inverse superimposition, and wherein there are also provided rolling cylinders, a second tunnel with cooled air circulation and then with humidification devices and devices for the projection of fire-proofing and germicidal products, and finally a calender with heated cylinders under pressure, before the cutting of the sheet or the formation of rolls.

The invention also has for its object the padding of insulation sheets or rolls obtained according to the manufacturing method by its execution by the above-quoted device.

With these and other objects in view, which will become apparent in the following detailed description, the present invention will be clearly understood in connection with the accompanying drawing, in which the single figure discloses diagrammatically the device of the present invention.

As shown in the drawing, the initial material, textile fibres in flock or frayed form are disposed by means of an automatic charging device 1 upon an endless conveyor 2 in more or less thick layers. The conveyor 2 feeds the material beneath a dosing device 3 for the dosage of powdered synthetic resins, provided with a fluted rotary feed cylinder 4, and into an enclosure 5 in which a certain negative pressure is produced by a blower 6 connected to two perforated drums 7 and 7'. A drum 8 equipped with steel points entrains the fibres, dividing them. Under the action of the negative pressure the fibres thus prepared are sucked in by the drums 7 and 7', between which they then pass to form a kind of sheet.

On emergence from between the drums 7 and 7' and then from the enclosure 5, the sheet is taken up again by a train 9 of a plurality of pairs of cylinders with controllable pressure between each pair of cylinders which provides the desired compactness for the sheet, according to the pressure, and it passes into a tunnel 11, conveyed by an endless conveyor 10 constituted by a belt formed by a kind of lattice of steel wire. It is crushed between the operative length 10' of the lattice belt 10 and the operative length 25' of a second latticed belt 25 superimposed on the first but in the opposite direction, the other length 25" of which passes outside the tunnel 11. The upper belt 25 passes over the upper fixed rollers 26 and over the lower rollers 27 mounted on a cross member which is adjustable in height according to the desired thickness of the sheet. It is driven in movement and a tensioning device 28 is provided.

The two lengths 10' and 10" of the latticed belt 10 run in the tunnel 11. The crushing of the sheet between the lengths 10' and 25' permits of imparting a goffering to the two surfaces and especially of obtaining great regularity.

Inside the tunnel 11, the sheet is permanently subjected to a current of hot air which passes right through it, which air current is produced by a heating installation 12 into which the air is sucked through a filter 13. The air heated to a temperature of about 200 to 220° C. is directed by a supply conduit 14 into distribution cones 15 disposed above the conveyor 10. Strips of sheet metal (not shown) are placed on the edges of the conveyor in order to shield them and thus to force the air to pass through the sheet instead of escaping laterally as a result of the lower resistance. This air, after having passed through the sheet is sucked through distribution cones 15' disposed in the converse position beneath the conveyor and they are connected to a return conduit 16. Thus the hot air is conducted in a closed circuit, ensuring rational utilisation and therefore fuel economy.

Under the effect of this current of hot air, melting of the synthetic resins occurs. The agglomeration of the fibres constituting the sheet is then caused by the passage of the sheet between a number of rolling cylinders 17, still in the tunnel 11. These rolling cylinders 17 can be goffered in order to impart a surface design in the passage of the sheet. The upper rolling cylinders 17 are mounted on the same cross member as the lower rollers 27 of the belt 25. The sheet then enters a cold zone constituted by a second shorter tunnel 18, in which it is permeated by a current of cold air delivered by a blower 19 into distribution cones 20, the number of which is less than in the first tunnel 11, still with the sheet metal strips, and sucked into the lower cones 20' by a blower 19' which delivers it to atmosphere.

In this same cold zone, the sheet, if desired, is humidified and at the same time fire-proofing and germicidal products are added.

The sheet then passes into a calender with heated cylinders 21, imparting the finishing by the obtaining of a compact smooth surface. According to the pressure to which the sheet is subjected in passing through the cylinders 21 of the calender, it is possible to obtain products of different qualities; thus for example unwoven felts are obtained by regulating the pressure to three tons.

However, the surface of the cylinders 21 of the calender can be profiled by means of rings slipped on to them, this permitting of dividing the sheet into rolls of section corresponding to the selected profile.

Finally the sheet is cut to the desired lengths by a guillotine cutter 22 above a lead bed 23, and the pieces are taken up by conveyor rollers 24 which take them to their destination.

It will be understood that according to the selection of the quantity of resins used and the value of the pressure of the rolling or calender cylinders 21, it is possible to obtain the desired quality of the finished product within a range extending from a very great flexibility to the compactness and hardness equalling that of wood.

The execution of the proposed method, as described above and illustrated diagrammatically, effects a significant simplification in the manufacture with more particularly the suppression of the conventional gumming operation, this manufacture being effected in continuous fashion and therefore with high output and economic application, obtaining a significant economy in its cost.

It should also be pointed out that this manufacture permits of obtaining paddings which compete with foam and plastic rubbers of higher price, which possess a lack of permeability, the absence of which renders these foams less hygienic.

While I have disclosed one embodiment of the present invention, it is to be understood that this embodiment is given by example only and not in a limiting sense, the scope of the present invention being determined by the objects and the claims.

I claim:

1. A method of manufacturing padding and insulating material from textile fibres comprising the steps of
adding powdered synthetic resins to a single layer of textile fibres to form a single sheet,
subjecting said sheet to a current of hot air passing through and across said sheet in order to effect melting and distribution of said resins on the opposite surfaces of and throughout said sheet,
subjecting said sheet thereafter to rolling in order to cause the agglomeration of said fibres,
exposing said sheet to a current of moist cooled air, and
passing said sheet over a heated calender to obtain a smooth compact surface.

2. A device for manufacturing continuously padding and insulating materials from textile fibres comprising
a charging device for textile fibres,
a conveyor disposed adjacent to and receiving said textile fibres from said charging device,
a dosing device for powdered synthetic resins disposed opposite said conveyor and adapted to deposit feeding dosages of said resins onto and through said textile fibres,
a container including a vacuum fibre divider disposed adjacent to said conveyor and receiving from the latter the mixture of said fibres with said resins,
a pair of oppositely disposed drums in said container,
said drums being subjected to pressure below atmospheric pressure to draw said mixture of fibres and resins to form a sheet,
a train of pairs of cylinders of variable pressure toward each other disposed adjacent said container and including means for imparting a predetermined compactness to said sheet,
a first tunnel means disposed adjacent said train of pairs of cylinders,
conveyor means for feeding said sheet from said train into said first tunnel means,
a plurality of cones secured in said first tunnel means opposite both faces of said sheet,
means for feeding hot air to each pair of said oppositely disposed cones by passing through and across said sheet,
said conveyor means including two endless latticed belts and a plurality of pairs of rolling cylinders adapted to engage the opposite faces of said sheet,
a second tunnel means disposed adjacent to said first tunnel means and receiving said sheet emerging from said first tunnel means,
means for feeding cooled air into said second tunnnel means,
means for adding moisture to said cooled air and
a calender having heated cylinders disposed adjacent to said second tunnnel means.

3. The device, as set forth in claim 2, which includes cutting means for said sheet in order to cut the latter upon emerging from said calender.

4. The device, as set forth in claim 2, wherein
each of said endless latticed belts has an inner reach and an outer reach,
one of said endless latticed belts is an upper belt,
said outer reach of said upper belt passing externally of said first tunnel means,
first fixed rollers supporting said outer reach of said upper belt,
a tensioning device engaging in said outer reach of said upper belt,
second rollers supporting said inner reach of said upper latticed belt,
a plurality of pairs of opposite rolling cylinders disposed in said first tunnel means on the opposite sides of the inner reaches of said latticed belts,
a cross member carrying said plurality of pairs of rolling cylinders as well as said second rollers, and
means for adjusting the distance of said cross member from the other of said latticed belts in order to carry the distance between the inner reach of said latticed belts and, thereby to change the thickness of said sheet.

5. The device, as set forth in claim 2, which includes
a plurality of pairs of cones having edges disposed on the opposite faces of and opening toward said sheet within said second tunnel means, in order to feed cooled air through and across said sheet.

6. The device, as set forth in claim 2, which includes a metal shield secured to said edges of said cones in order to shield said edges and force the air stream to pass through and across said sheet.

7. The device, as set forth in claim 2, which includes means for applying pressure to said heated cylinders of said calender and including means for adjusting the pressure relative to each other.

References Cited by the Examiner

UNITED STATES PATENTS

| | | | |
|---|---|---|---|
| 810,935 | 1/06 | Goldman | 264—119 |
| 2,288,072 | 6/42 | Collins | 264—122 XR |
| 2,357,042 | 8/44 | Coss et al. | 264—121 |
| 2,543,101 | 2/51 | Francis | 264—112 |

ALEXANDER H. BRODMERKEL, *Primary Examiner.*

EARL M. BERGERT, *Examiner.*